United States Patent

Sullivan

[11] Patent Number: 4,793,782
[45] Date of Patent: Dec. 27, 1988

[54] COTTON CANDY MACHINE

[75] Inventor: John T. Sullivan, Washington, D.C.
[73] Assignee: Sells-Floto Inc., Washington, D.C.
[21] Appl. No.: 942,739
[22] Filed: Dec. 17, 1986
[51] Int. Cl.$^4$ ............................................. B29C 67/02
[52] U.S. Cl. .......................................... 425/7; 264/8; 425/8; 425/9
[58] Field of Search ................... 425/9, 8, 7; 264/103, 264/DIG. 75; 65/6, 8, 14, 15

[56] References Cited

U.S. PATENT DOCUMENTS

| 1,489,342 | 4/1924 | Brent | 425/9 |
| 3,036,532 | 5/1962 | Bowe | 425/9 |
| 3,073,262 | 1/1963 | Bowe | 425/9 |

FOREIGN PATENT DOCUMENTS 364723  8/1906 France .................................... 425/9

Primary Examiner—Jay H. Woo
Assistant Examiner—C. Scott Bushey
Attorney, Agent, or Firm—Blum Kaplan

[57] ABSTRACT

A floss head assembly for making striped cotton candy is provided. The floss head assembly has upper and lower chambers that are adapted to melt two different colors of sugar in order to provide striped cotton candy. A stripe enhancer is provided intermediate the upper and lower chambers and serves to maintain distinct colors without the chambers when liquid sugar is flung from the floss head assembly and crystallized into confectionary fluff.

10 Claims, 4 Drawing Sheets

４,793,782

COTTON CANDY MACHINE

BACKGROUND OF THE INVENTION

This invention relates to cotton candy machines and, in particular, to a floss head assembly for a cotton candy machine that is suitable for making striped cotton candy.

Cotton candy and correspondingly, machines for making cotton candy, are well known. Cotton candy is spun sugar, i.e., sugar that has been threaded into a convectionary fluff or floss. In general, colored sugar is used to make cotton candy and therefore, the cotton candy is itself colored. The most predominant color is pink and the second most predominant color is blue.

Heretofore, efforts to provide striped or multi-colored cotton candy using conventional cotton candy machines have been less than completely satisfactory because the different colored sugars melt together to form confectionary fluff of a single mixed color. Accordingly, it is desirable to provide a cotton candy machine that overcomes the aforenoted disadvantages of prior art cotton candy machines.

SUMMARY OF THE INVENTION

Generally speaking, in accordance with the invention a floss head assembly for making striped cotton candy is provided. The floss head assembly has upper and lower chambers that are adapted to melt two different colors of sugar in order to provide striped cotton candy. In an exemplary embodiment, a stripe enhancer is provided intermediate the upper and lower chambers and serves to maintain distinct colors externally of the chambers when liquid sugar is flung from the floss head assembly and crystallized into confectionary fluff.

Accordingly, it is an object of the invention to provide an improved floss head assembly for use in a cotton candy machine.

It is a further object of the invention to provide a floss head assembly for producing striped cotton candy.

Still other objects and advantages of the invention will in part be obvious and will in part be apparent from the specification.

The invention accordingly comprises the features of construction, combination of elements, and arrangement of parts which will be exemplifed in the construction hereinafter set forth, and the scope of the invention will be indicated in the claims.

DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENT

Figure 1:
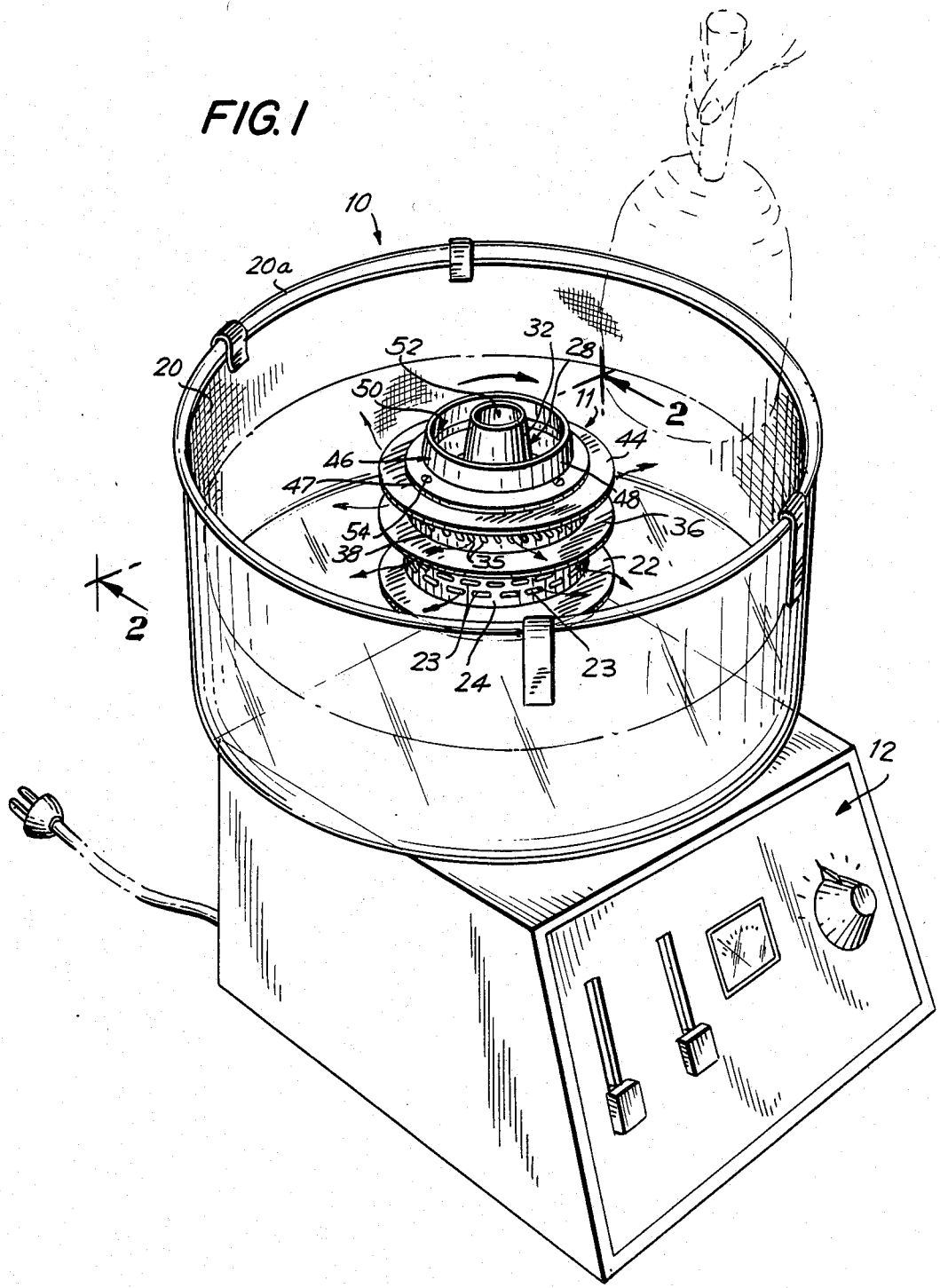
FIG. 1 is a perspective view of a cotton candy machine constructed and arranged in accordance with the invention.

Referring to FIGS. 1-4, a cotton candy machine generally indicated at 10 is constructed and arranged in accordance with a preferred embodiment of the invention. A housing, generally indicated as 12, supports a tub 20. Housing 12 includes an electric motor (not shown), an on-off switch and several switches which are conventional and form no part of the invention.

Supported on housing 12, within tub 20, is a rotatable floss head assembly 11. Floss head assembly 11 includes a turntable 14 mounted to a rotatable shaft 16. Shaft 16 is mechanically coupled to the motor in housing 12 and rotates turntable 14 in a conventional manner. Connectors 15a are supported on the turntable 14 and permit leads 17 (FIG. 2) to be connected thereto. An annular spacer 18 is supported on turntable 14 and has secured thereto an annular gasket 19.

An annular stripe enhancer 22 is seated on gasket 19 so that it is carried by the turntable 14 during rotation. A lower slotted head 24 is supported by the turntable 14, stripe enhancer 22 and gasket 19 so as to define a lower heating chamber, generally indicated at 26. Slotted head 24 includes slotted openings 23 and is conventional except for the annular orientation of the openings 23. Secured to the slotted head 24 slightly spaced on inner surface thereof of slotted head 24 is a heating band 25. Heating band 25 is connected by leads 42A which leads are referenced to a power supply (PS, FIG. 2) to permit heating of the heating band 25. Heating band 25 is conventional and is utilized in a cotton candy machine to heat crystallized sugar when it is introduced into the chamber 26.

An annular gasket 27 is supported on slotted head 24 and has seated thereon a one-piece metal inner barrier assembly, generally indicated at 28. Inner barrier assembly 28 includes a support plate 29 having an inwardly stepped bottom plate 30 and an inwardly stepped top plate 31 axially oppositely projecting therefrom. Connectors 15b are supported on the bottom plate 30 and are connected to connectors 15a secured to turntable 14 through leads 17. Connectors 15b are also connected to heating band 25 through leads 42a. Accordingly, lower heating chamber 26 is defined by turntable 14, slotted head 24 and bottom plate 30.

Figure 2:
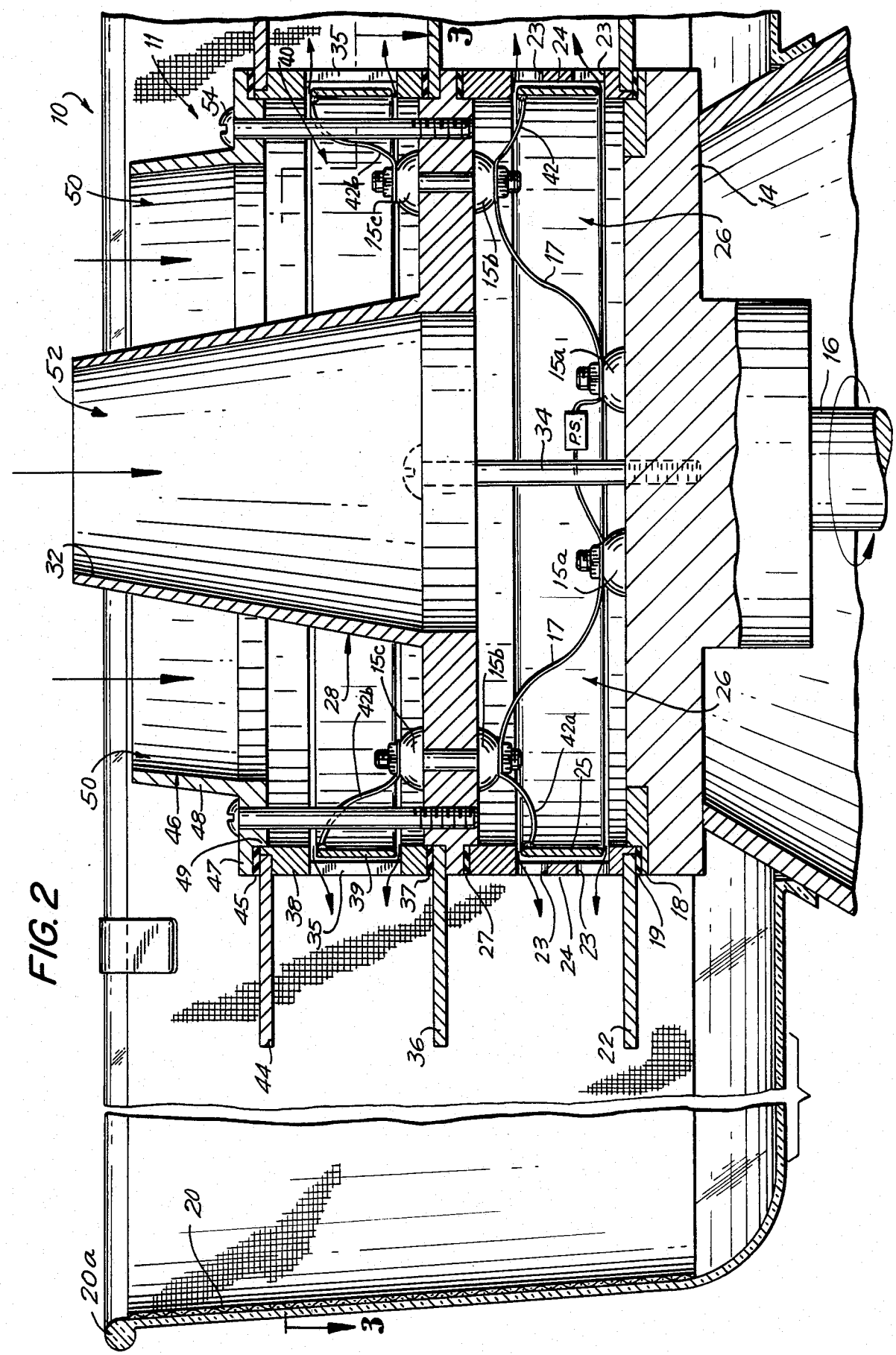
FIG. 2 is an enlarged fragmentary sectional view of the cotton candy machine of FIG. 1 taken along section line 2—2.
Figure 3:
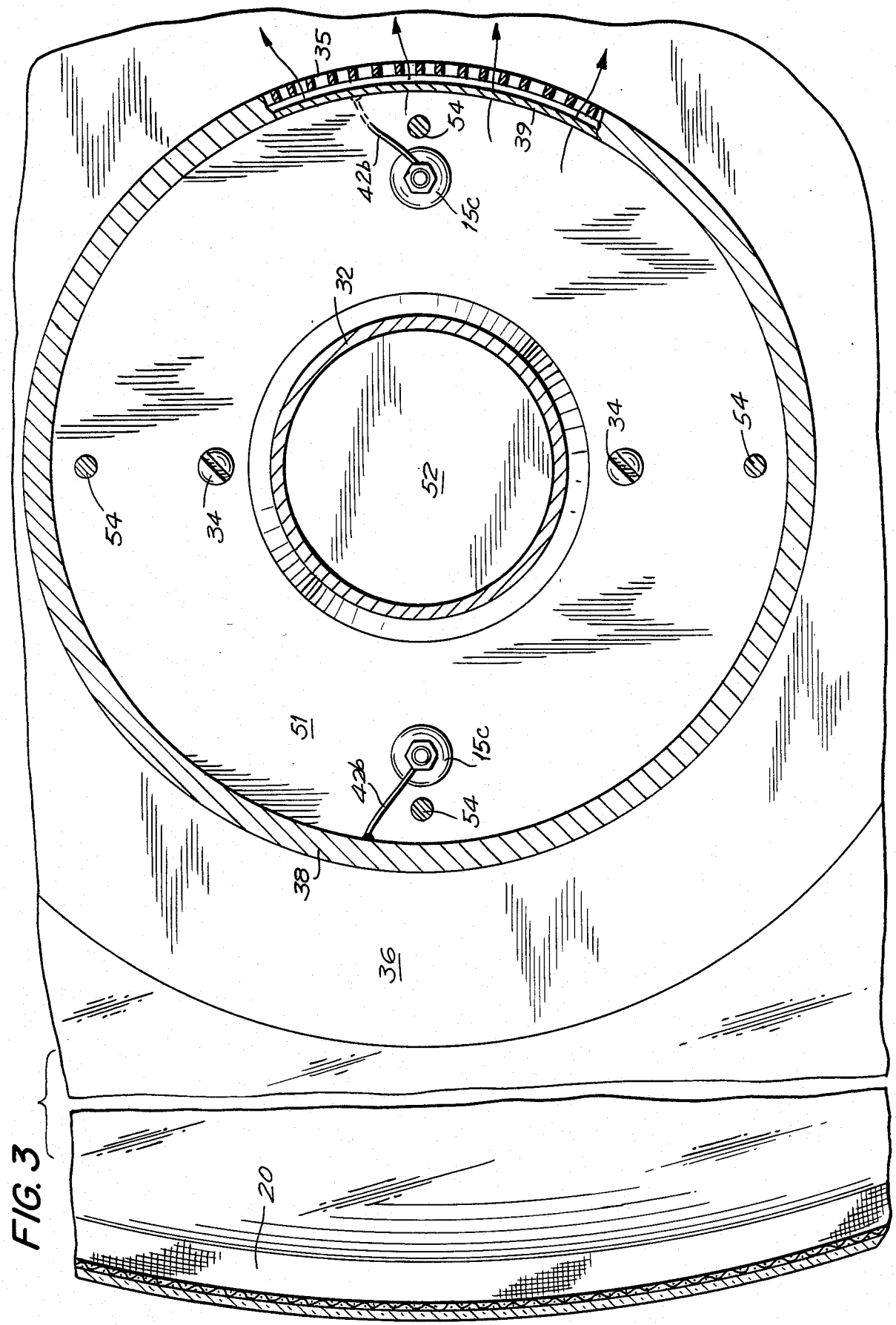
FIG. 3 is a fragmentary sectional view of the cotton candy machine of FIGS. 1 and 2 taken along section line 3—3 of FIG. 2.
Figure 4:
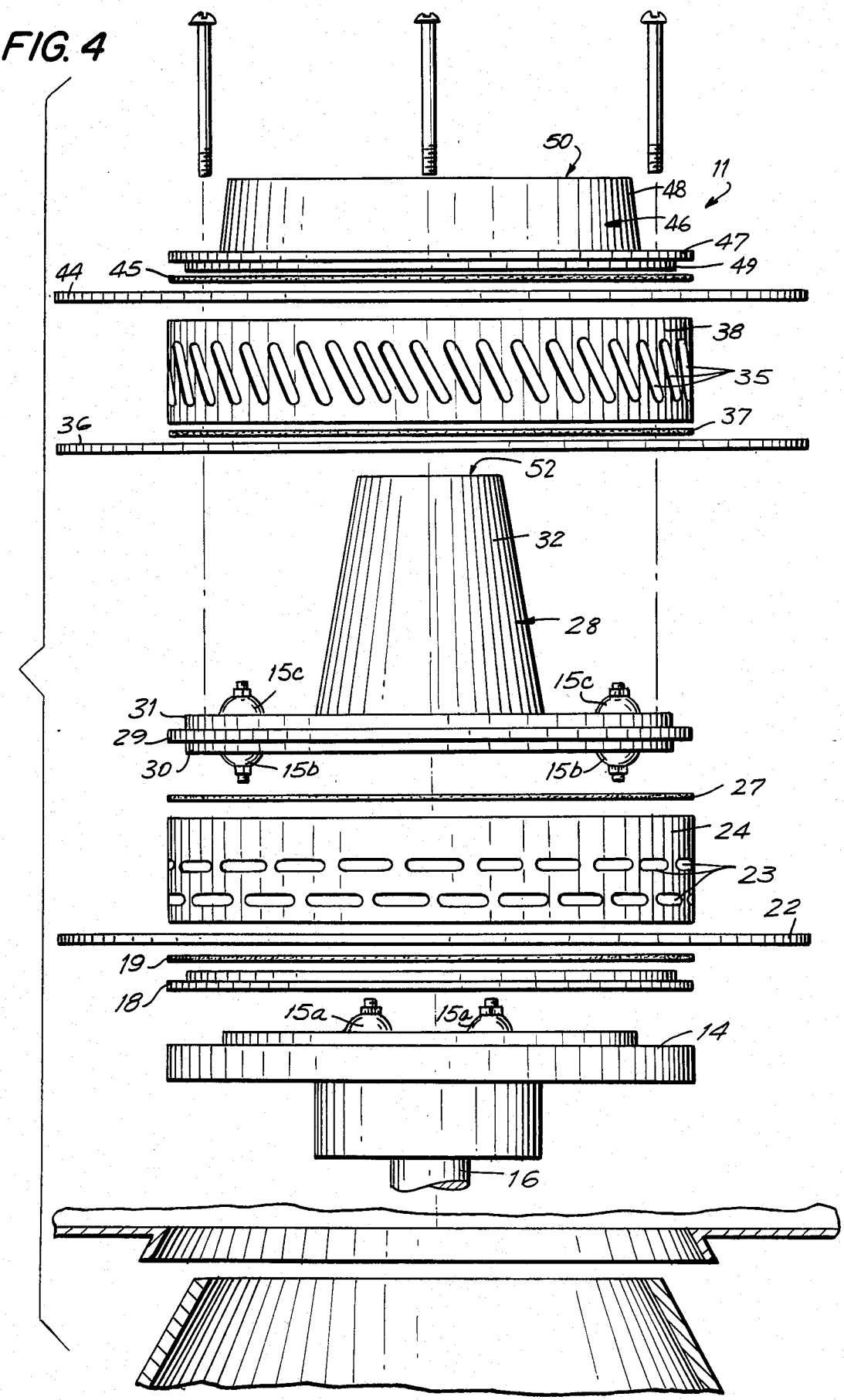
FIG. 4 is an exploded side elevational view of a floss head assembly constructed and arranged in accordance with the invention.

Inner barrier assembly 28 further includes a first conical inner wall 32 having a length sufficient to project to or above the top of floss head assembly 11 and an upper edge 20a of the tub 20. As is best illustrated in FIG. 2, wall 32 defines an opening 52 or port at the top thereof and is open throughout the length thereof to provide an entrance to lower heating chamber 26. Several bolts 34 pass through the support plate 29 and anchor barrier assembly 28 to the turntable 14 so that the entire assembly is secured together and turns as a unit.

Annular stripe enhancer 36 is seated on support 29 and supports annular gasket 37. Upper slotted head 38 is supported on gasket 37 in the same manner discussed heretofore with respect to lower slotted head 24, to define an upper chamber, generally indicated at 40. Slotted head 38 includes slotted openings 35 which are oriented at 45° to the axis of rotation of the shaft 16 in a conventional manner. Disposed within upper slotted head 38 slightly spaced from but connected to upper slotted head 38 is heating band 39 which is used to heat the crystallized sugar in a conventional manner.

As is best illustrated in FIG. 2, heating band 39 is connected to connectors 15c through leads 42b to permit heating thereof. A stripe enhancer 44 and gasket 45 are supported on upper slotted head 38. Seated on the gasket 45 and upper slotted head 38 is a frusto-conical outer barrier assembly, generally indicated as 46.

Outer barrier assembly 46 includes a support 47, an inwardly stepped bottom plate 49 and upper frusto-conical outer wall 48 which defines an outer opening or port 50 surrounding inner port 52 to permit access between outer wall 48 and inner wall 32 to the upper chamber 40. Bolts 54 pass through support 47 of outer barrier assembly 46 and anchor outer barrier assembly 46 to inner barrier assembly 28 so that the entire floss head assembly rotates with turntable 14.

In operation, sugars having a first color such as pink are introduced into outer port 50 and sugar having a second color such as blue is introduced into inner port 52. The sugar having a first color that is introduced into outer port 50 enters upper heating chamber 40. The sugar having the second color is introduced through port 52 and enters the lower heating chamber 26.

Power is supplied through connectors or leads 15a, 15b, 15c, 17, 42a and 42b to heating band 25 and heating band 39. Heating bands 25 and 39 are adapted to be heated to a temperature sufficient to melt sugar. It is important that each of wire leads 17, 42a and 42b be insulated so as not to be affected by melted sugar.

Shaft 16 rotates floss head assembly 11 at a rate of approximately 5,000 rpm. The sugar flies towards the outside walls of floss head assembly 11 and, specifically, towards upper and lower heating bands 39 and 25, respectively, in each of upper and lower heating chambers 40 and 26. The sugar is melted by the respective heating bands 39 and 25 and exits floss head assembly 11 through slot openings 35 and 23, respectively. As the suguar exits through the slots 35 and 23, it is recrystallized in the form of two-colored confectionary fluff. Color separation is provided by the upper and lower chambers 40 and 27 and is maintained as the confectionary fluff flies towards the inside wall of tub 20 and is enhanced by stripe enhancers 44, 36 and 22. The axial projection of the stripe enhancers 44, 36 and 36,22 beyond the slots 35, 23 respectively, therebetween, functions to prevent undesired axial spread of the melted sugar exiting the slots 35, 23 during rotation of the floss head assembly 11. This, in turn, enhances and highlights the separation of the two different bands of the floss. Accordingly, confectionary fluff on the inside wall of tub 20 can be gathered on a stick to form striped cotton candy.

Accordingly, the instant invention is particularly characterized by the use of two physically separated chamber and barrier assemblies that permit different colored sugar to be introduced into the chambers. Color separation is enhanced by utilizing at least one color enhancer intermediate the upper and lower chamber and is further enhanced by utilizing further stripe enhancers at the boundaries of the respective chambers.

Also, the slotted opening 35 are oriented at 45° and the remaining openings 23 in the lower slotted head are circumferentially oriented. It has been found that the sugar is more likely to fly outwardly from the openings when they are oriented circumferentially, thus helping to maintain color separation in the final cotton candy product. In a preferred embodiment, the slotted openings in both the upper and lower slotted heads 38, 24 should be circumferentially disposed to obtain this benefit. However, the slots 35 have been shown at an angle of 45° to demonstrate, by way of example, that color separation is still obtainable in accordance with the teaching of the instant invention whether all or a combination of some of the slotted openings are oriented at a 45° angle or circumferentially oriented.

Also, in a preferred embodiment, upper and lower slotted heads 38 and 24 are constructed of a suitable material such as metal covered wtih porcelain, high temperature plastic or solid ceramic. As with all of the parts of the floss head assembly 11, it is important that the slotted heads 38, 24 are not affected by the heat generated by the heating bands 39, 25, respectively. However, all of the other parts are sufficiently distant from the heating bands 39, 25 that they can be made of metal and are, preferably, machined of aluminum.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed:

1. A floss head assembly for use in a cotton candy machine comprising a first rotatably supported cotton candy chamber means for heating and dispensing melted sugar, said first chamber means including first port means for introducing sugar into said first chamber means, the first port means including a frusto-conical wall concentrically disposed about the axis of rotation of the support, second rotatably supported cotton candy chamber means separated from said first cotton candy chamber means, said second chamber means including a second port means for introducing sugar into said second chamber means, said second port means having a conical wall concentrically disposed about the axis of rotation of the support and about said frusto-conical wall to define therebetween an opening to said second chamber means, said frusto-conical wall extending beyond the conical wall, a first annular stripe enhancer positioned intermediate said first and second chamber means and said first and second chamber means constructed and arranged to independently produce melted sugar which recrystallizes into confectionary fluff at the same time exteriorly of the respective chamber means so that said recrystallized confectionary fluff produced is striped when a first color sugar and a second color sugar are respectively introduced into said first and second chamber means.

2. The floss head assembly of claim 1, wherein said first chamber means includes a first slotted head having radially disposed openings for permitting the melted sugar to be dispensed therethrough and said second chamber means includes a second slotted head having radially disposed openings for permitting the melted sugar to be dispensed therethrough.

3. The floss head assembly of claim 1, wherein the first and second chamber means are rotatably supported on a rotatable support so that both the first and second chamber means are adapted to rotate simultaneously about a single axis of rotation.

4. The floss head assembly of claim 1, wherein the floss head assembly is provided in a tub and said confectionary fluff is collected on the inside of the tub.

5. The floss head assembly of claim 1 further comprising a second stripe enhancer means spaced apart from said first stripe enhancer means so that said openings in said first slotted head are positioned to permit the melted sugar to be dispensed therethrough between said first and second stripe enhancer means.

6. The floss head assembly of claim 5, further comprising a third stripe enhancer means spaced apart from said first stripe enhancer means so that said openings in said second head permit the melted sugar to be dispensed therethrough between said first and third stripe enhancer means.

7. The floss head assembly of claim 2, wherein each slotted head has a heating band associated therewith.

8. The floss head assembly of claim 7, wherein each heating band is connected through wire leads to a power source and is adapted to be heated to a temperature sufficient to melt sugar.

9. The floss head assembly of claim 2, wherein the openings are oriented circumferentially.

10. The floss head assembly of claim 2, wherein the openings are disposed at an angle of substantially 45°.

* * * * *